United States Patent Office 3,264,293
Patented August 2, 1966

3,264,293
UNSYMMETRICALLY SUBSTITUTED 1,3,5-TRIAZINES AND THEIR PRODUCTION
Werner Heimberger, Hanau am Main, Germany, assignor to Deutsche Gold- und Silber-Scheideanstalt vormals Roessler, Frankfurt am Main, Germany
No Drawing. Filed June 7, 1963, Ser. No. 286,188
Claims priority, application Germany, June 8, 1962, D 39,115
2 Claims. (Cl. 260—248)

The present invention relates to novel unsymmetrically substituted 1,3,5-triazines and more particularly to novel 2,4-bistrichloromethyl substituted triazines of the formula

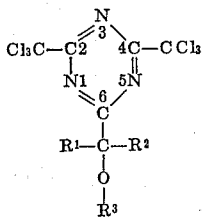

wherein each of $R^1$ and $R^2$ is selected from the group consisting of hydrogen, lower alkyl and lower haloalkyl and $R^3$ is an acyl group, preferably a lower alkanoic acid acyl, or a carboloweralkoxy group, such as, for example, acetyl, carbethoxy, carbomethoxy groups and a process for their production.

It is known (Christoph Grundmann et al. A 577, (1952), 77) that nitriles can be converted to the corresponding 1,3,5-triazine in the presence of catalysts such as hydrogen halides or hydrogen halide forming substances, such as, halogens, aluminum chloride chlorosulfonic acid and the like. For example, the nitriles can be mixed with each other and converted to the imide chlorides by the introduction of, for example, hydrogen chloride. The imide chlorides upon longer standing under exclusion of moisture form the triazine with liberation of hydrogen chloride. This process can be used to produce triazines having substituents which differ from each other. Depending upon the reaction velocity of the nitriles concerned one can either mix all components together before beginning the hydrogen chloride introduction or first treat the slower reacting nitriles with hydrogen chloride and only adding the other faster reacting components later. In general, the hydrogen chloride is introduced at low temperatures until the imide chlorides precipitate out. As very variable products may be produced because of the different reaction velocities of the nitriles concerned the yields are very changeable and the conditions for the reaction must be ascertained for each individual case.

It was unexpectedly found that the unsymmetrically substituted triazines according to the invention could be obtained in a simple manner and in good yields by reacting trichloroacetonitrile with an acylated cyanhydrin in a molar ratio of 2:1 in the presence of catalysts such as normally used in the production of 1,3,5-triazines from nitriles.

The acylated cyanhydrins can, for example, be derived from the lower saturated or unsaturated aliphatic aldehydes or ketones, such as, for example, formaldehyde cyanhydrin, acetaldehyde cyanhydrin, acrolein cyanhydrin, acetone cyanhydrin and the like. The acyl group serving to acylate the primary, secondary or tertiary α hydroxy group of such cyanhydrins, for example, can be the lower alkanoic acid acyl groups or carboloweralkoxy groups.

As indicated above, the catalysts which are required for carrying out the process according to the invention are known. Primarily concerned are hydrogen halides or such substances which under the reaction conditions easily form hydrogen halides, such as, for example, the halogens. Aluminum chloride, chlorosulfonic acid and the like can also be used. Depending upon the reactivity of the nitriles employed one or also two of such catalysts are employed, for example, either only hydrogen chloride or hydrogen chloride in combination with aluminum chloride or chlorosulfonic acid can be employed. In general, the initiation of the reaction proceeds more favorably at higher hydrogen halide concentrations. However, during the further progress of the reaction hydrogen halide is again set free. Especially aluminum chloride accelerates the ring closure in a noteworthy manner. For this purpose, the catalyst in general is employed in quantities of 5 to 10% by weight of the starting nitriles.

The reaction according to the invention can, for example, be carried out by first mixing the starting nitriles and then after cooling such mixture treating it with the catalyst. Preferably, a hydrogen halide, especially hydrogen chloride, is employed as the catalyst. The introduction of the hydrogen halide into the mixture of nitriles should be effected at a temperature below room temperature down to about −20° C. Preferably, a temperature between 0 and −10° C. is employed. In general the introduction of the hydrogen halide should be continued until the reaction mixture is saturated. This usually is evidenced by precipitation of crystals and depends upon the starting acylated cyanhydrin and other conditions. The resulting reaction mixture is then permitted to stand for some time, for example, from about 24 hours to about 5 days while taking precautions to exclude moisture. The temperature during such period, however, can rise to +10 −20° C. The ring closure completes itself during such period without further measures but if desired it may be accelerated by heating to temperatures, for example, between 100 and 150° C. After the reaction is completed, the reaction mixture, for example, can be processed by treatment with an 80% aqueous methanol solution.

It is of advantage to carry out the process according to the invention in a polar organic solvent, such as an ester, an ether, dioxane, dimethyl glycol, formamide and the like. The reaction can be conducted better with the aid of such solvents. Of course, it is then necessary to distill off the solvent before recovery of the substituted triazine products.

In some instances it can be expedient first to treat the acylated cyanhydrin by itself with the catalyst and only add the trichloroacetonitrile subsequently. In this instance, also, the other reaction conditions are maintained as previously described.

The halogen atoms of the trichloromethyl groups in the compounds according to the invention can be substituted by other groups, such as amino groups, alkylated amino groups, ether groups, hydroxyl groups and the like. Furthermore, by hydrolysis or saponification of the acyl groups in the substituent in position 6 the corresponding alcohol derivatives can be obtained which in turn are capable of undergoing further reactions. As a consequence the compounds according to the invention provide advantageous intermediates for the production of other asymmetrically substituted 1,3,5-triazines. The compounds according to the invention are furthermore useful pesticides, especially herbicides with a good selectivity.

The following examples will serve to illustrate the invention with reference to several embodiments thereof.

Example 1

1.05 mol of ethyl chloroformate was added dropwise to a mixture of 1.0 mol of acetone cyanhydrin, 1.05 mol triethylamine and 2 mol methylene chloride at 10° C. while stirring. Quantitative conversion took place and the triethylammonium chloride was shaken out with water and the carbethoxy ester of acetone cyanhydrin purified by distillation at 78° C. under a pressure of 6 torr. The yield was 80%.

The carbethoxy esters of formaldehyde cyanhydrin and of acetaldehyde cyanhydrin were obtained analogously in about an 80% yield. The former distilled at 68–70° C. under a pressure of 5 torr and the latter at 55° C. under a pressure of 2 torr.

The carbomethoxy esters can be obtained in a similar manner using methyl chloroformate instead of ethyl chloroformate.

Example 2

A mixture of 50 g. of carbethoxy acetone cyanhydrin and 75 g. of ethyl acetate was cooled to −10° C. and dry HCl introduced for a period of 2 hours. Then 92 g. of trichloroacetonitrile were added and the introduction of the HCl continued for 2 further hours. During this time 60 g. of HCl were taken up. The molar ratio of the carbethoxy acetone cyanhydrin and trichloroacetonitrile was 1:2. A thick crystal paste was formed which after 24 hours' standing at +10° C. fully redissolved. After 5 days' standing at 10–20° C. the solvent was distilled off under vacuum at about 50° C. and the crystal containing residue which weighed about 147 g. stirred with a mixture of 80% of methanol and 20% $H_2O$ whereupon the non-crystalline portion went into solution with slight warming. The undissolved crystals were filtered off and re-washed and dried.

The yield was 99 g. of 2,4-bistrichloromethyl-6-[α-(cathyl)-α-methyl-ethyl]-1,3,5-triazine (70% of theory) of a melting point of 84–86° C.

Example 3

A mixture of 1 mol of carbethoxy acetaldehyde cyanhydrin, 2 mol of trichloroacetonitrile and 1.5 mol of ethyl acetate was cooled to −10° C. and dry HCl introduced into such mixture until it was saturated therewith (about 4 hours). The reaction mixture was then permitted to stand and processed in a manner analogous to Example 1. The yield of 2,4-bistrichloromethyl-6-carbethoxymethyl-methylol-1,3,5-triazine was 70% of theory. It had a melting point of 100–103° C.

Example 4

The procedure of Example 3 was repeated using a starting mixture of 130 g. of acetyl acetaldehyde cyanhydrin and 332 g. of trichloroacetonitrile (molar ratio of 1:2) in 330 cc. of ethyl acetate. The HCl was introduced into such mixture until 222 g. had dissolved therein. The reaction mixture was permitted to stand and processed as in Example 1. The yield of 2,4-bistrichloromethyl-6-acetylmethyl-methylol-1,3,5-triazine was about 60% of theory.

2,4-bistrichloromethyl-6 - acetyl-methylol-1,3,5-triazine of a melting point of 83–85° C., 2,4-bistrichloromethyl-6-acetylisopropylol-1,3,5-triazine of a melting point of 80–81° C. and 2,4-bistrichloromethyl-6-acetyltrichloromethyl-methylol-1,3,5-triazine of a melting point of 124–126° C. were obtained analogously.

Example 5

Hydrogen chloride gas was introduced for 2 hours into a solution of 12.5 g. of α-acetoxy-α-vinyl acetonitrile (produced by acetylation of acrolein cyanhydrin) in 20 cc. of ethyl acetate at −10° C. while excluding atmospheric moisture. Thereafter 28.9 g. of trichloroacetonitrile were added and further HCl introduced into the homogeneous reaction mixture at the same temperature until a thick crystalline paste was produced. Subsequently the reaction mixture was permitted to stand for two days at room temperature while excluding atmospheric moisture. During such period, a portion of the crystals were redissolved. The solvent was then distilled off leaving a crystallized residue in a yield of 95% of theory. Upon washing with 80% aqueous methanol the purified trimerisate of a melting point of 89–91° C. was obtained. The yield was 36.5 g. (81% of theory) of 2,4-bistrichloromethyl - 6-γ-chloro-α-acetoxypropyl - 1,3,5-triazine.

Analysis.—Calculated: C, 26.62%; H, 1.77%; Cl, 55.17%; N, 9.32%. Found: C, 26.67%; H, 1.68%; Cl, 55.17%; N, 9.01%.

I claim:

1. A 2,4-bistrichloromethyl substituted triazine of the formula

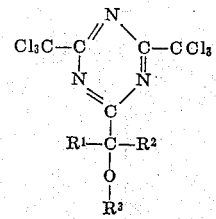

wherein each of $R^1$ and $R^2$ is selected from the group consisting of hydrogen, lower alkyl and lower halo alkyl and $R^3$ is an acyl group selected from the group consisting of lower alkanoic acid acyl groups and carbo loweralkoxy groups.

2. 2,4-bis-(trichloromethyl) - 6-[α-(cathyl) - α-methyl ethyl]-1,3,5-triazine.

References Cited by the Examiner

UNITED STATES PATENTS

| | | | |
|---|---|---|---|
| 1,989,042 | 1/1935 | Kunz et al. | 260—248 |
| 2,525,714 | 10/1950 | Norton | 260—248 |
| 2,858,310 | 10/1958 | Grundmann et al. | 260—248 |

WALTER A. MODANCE, *Primary Examiner.*

J. M. FORD, *Assistant Examiner.*